(12) United States Patent
Wolrich et al.

(10) Patent No.: US 7,546,444 B1
(45) Date of Patent: Jun. 9, 2009

(54) REGISTER SET USED IN MULTITHREADED PARALLEL PROCESSOR ARCHITECTURE

(75) Inventors: Gilbert Wolrich, Framingham, MA (US); Matthew J. Adiletta, Worcester, MA (US); William R. Wheeler, Southborough, MA (US); Debra Bernstein, Sudbury, MA (US); Donald F. Hooper, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 950 days.

(21) Appl. No.: 10/070,091

(22) PCT Filed: Aug. 31, 2000

(86) PCT No.: PCT/US00/23993

§ 371 (c)(1),
(2), (4) Date: Jun. 28, 2002

(87) PCT Pub. No.: WO01/16702

PCT Pub. Date: Mar. 8, 2001

Related U.S. Application Data

(60) Provisional application No. 60/151,961, filed on Sep. 1, 1999.

(51) Int. Cl.
G06F 9/00 (2006.01)
G06F 12/00 (2006.01)
(52) U.S. Cl. .................................................. 712/228
(58) Field of Classification Search ................ 712/228, 712/246; 718/108, 104; 711/173
See application file for complete search history.

(56) References Cited

U.S. PATENT DOCUMENTS

| | | | |
|---|---|---|---|
| 3,373,408 A | 3/1968 | Ling |
| 3,478,322 A | 11/1969 | Evans |
| 3,577,189 A | 5/1971 | Cocke et al. |
| 3,792,441 A | 2/1974 | Wymore et al. |
| 3,881,173 A | 4/1975 | Larsen et al. |
| 3,913,074 A | 10/1975 | Homberg et al. |
| 3,940,745 A | 2/1976 | Sajeva |
| 4,023,023 A | 5/1977 | Bourrez et al. |
| 4,130,890 A | 12/1978 | Adam |
| 4,392,758 A | 7/1983 | Bowles et al. |

(Continued)

FOREIGN PATENT DOCUMENTS

EP 0 130 381 1/1985

(Continued)

OTHER PUBLICATIONS

Chen et al., "The Compiler for Supporting Multithreading in Cyclic Register Windows", pp. 57-62, IEEE, 1996.*

(Continued)

*Primary Examiner*—Eric Coleman
(74) *Attorney, Agent, or Firm*—Fish & Richardson P.C.

(57) ABSTRACT

A parallel hardware-based multithreaded processor is described. The processor includes a general purpose processor that coordinates system functions and a plurality of microengines that support multiple hardware threads or contexts (THREAD_3 . . . THREAD_0). The processor maintains execution threads (THREAD_3 . . . THREAD_0) access a register set organized into a plurality of relatively addressable windows of registers that are relatively addressable per thread (THREAD_3 . . . THREAD_0).

20 Claims, 6 Drawing Sheets

U.S. PATENT DOCUMENTS

| | | |
|---|---|---|
| 4,400,770 A | 8/1983 | Chan et al. |
| 4,454,595 A | 6/1984 | Cage |
| 4,471,426 A | 9/1984 | McDonough |
| 4,477,872 A | 10/1984 | Losq et al. |
| 4,514,807 A | 4/1985 | Nogi |
| 4,523,272 A | 6/1985 | Fukunaga et al. |
| 4,569,016 A | 2/1986 | Hao et al. |
| 4,606,025 A | 8/1986 | Peters et al. |
| 4,724,521 A | 2/1988 | Carron et al. |
| 4,742,451 A | 5/1988 | Bruckert et al. |
| 4,745,544 A | 5/1988 | Renner et al. |
| 4,754,398 A | 6/1988 | Pribnow |
| 4,755,966 A | 7/1988 | Lee et al. |
| 4,777,587 A | 10/1988 | Case et al. |
| 4,808,988 A | 2/1989 | Burke et al. |
| 4,816,913 A | 3/1989 | Harney et al. |
| 4,847,755 A | 7/1989 | Morrison et al. |
| 4,866,664 A | 9/1989 | Burkhardt, Jr. et al. |
| 4,868,735 A | 9/1989 | Moller et al. |
| 4,992,934 A | 2/1991 | Portanova et al. |
| 5,045,995 A | 9/1991 | Levinthal et al. |
| 5,056,015 A | 10/1991 | Baldwin et al. |
| 5,073,864 A | 12/1991 | Methvin et al. |
| 5,113,516 A | 5/1992 | Johnson |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,165,025 A | 11/1992 | Lass |
| 5,168,555 A | 12/1992 | Byers et al. |
| 5,170,484 A | 12/1992 | Grondalski |
| 5,173,897 A | 12/1992 | Schrodi et al. |
| 5,187,800 A | 2/1993 | Sutherland |
| 5,189,636 A | 2/1993 | Patti et al. |
| 5,202,972 A | 4/1993 | Gusefski et al. |
| 5,220,669 A | 6/1993 | Baum et al. |
| 5,247,671 A | 9/1993 | Adkins et al. |
| 5,255,239 A | 10/1993 | Taborn et al. |
| 5,263,169 A | 11/1993 | Genusov et al. |
| 5,274,770 A | 12/1993 | Khim Yeoh et al. |
| 5,347,648 A | 9/1994 | Stamm et al. |
| 5,357,617 A | 10/1994 | Davis et al. |
| 5,363,448 A | 11/1994 | Koopman, Jr. et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,394,530 A | 2/1995 | Kitta |
| 5,404,464 A | 4/1995 | Bennett |
| 5,404,482 A | 4/1995 | Stamm et al. |
| 5,428,779 A | 6/1995 | Allegrucci et al. |
| 5,428,809 A | 6/1995 | Coffin et al. |
| 5,432,918 A | 7/1995 | Stamm |
| 5,436,626 A | 7/1995 | Fujiwara |
| 5,442,756 A | 8/1995 | Grochowski et al. |
| 5,448,702 A | 9/1995 | Garcia, Jr. et al. |
| 5,450,351 A | 9/1995 | Heddes |
| 5,450,603 A | 9/1995 | Davies |
| 5,452,437 A | 9/1995 | Richey et al. |
| 5,459,842 A | 10/1995 | Begun et al. |
| 5,463,625 A | 10/1995 | Yasrebi |
| 5,463,746 A | 10/1995 | Brodnax et al. |
| 5,467,452 A | 11/1995 | Blum et al. |
| 5,481,683 A | 1/1996 | Karim |
| 5,487,159 A | 1/1996 | Byers et al. |
| 5,509,130 A | 4/1996 | Trauben et al. |
| 5,517,628 A | 5/1996 | Morrison et al. |
| 5,517,648 A | 5/1996 | Bertone et al. |
| 5,541,920 A | 7/1996 | Angle et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,544,337 A | 8/1996 | Beard et al. |
| 5,550,816 A | 8/1996 | Hardwick et al. |
| 5,557,766 A | 9/1996 | Takiguchi et al. |
| 5,568,617 A | 10/1996 | Kametani |
| 5,572,690 A | 11/1996 | Molnar et al. |
| 5,574,922 A | 11/1996 | James |
| 5,574,939 A | 11/1996 | Keckler et al. |
| 5,592,622 A | 1/1997 | Isfeld et al. |
| 5,600,812 A | 2/1997 | Park |
| 5,600,848 A | 2/1997 | Sproull et al. |
| 5,606,676 A | 2/1997 | Grochowski et al. |
| 5,610,864 A | 3/1997 | Manning |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,640,538 A | 6/1997 | Dyer et al. |
| 5,644,623 A | 7/1997 | Gulledge |
| 5,649,157 A | 7/1997 | Williams |
| 5,652,583 A | 7/1997 | Kang |
| 5,659,687 A | 8/1997 | Kim et al. |
| 5,659,722 A | 8/1997 | Blaner et al. |
| 5,669,012 A | 9/1997 | Shimizu et al. |
| 5,680,564 A | 10/1997 | Divivier et al. |
| 5,680,641 A | 10/1997 | Sidman |
| 5,689,566 A | 11/1997 | Nguyen |
| 5,692,167 A | 11/1997 | Grochowski et al. |
| 5,699,537 A | 12/1997 | Sharangpani et al. |
| 5,701,435 A | 12/1997 | Chi |
| 5,704,054 A | 12/1997 | Bhattacharya |
| 5,717,760 A | 2/1998 | Satterfield |
| 5,717,898 A | 2/1998 | Kagan et al. |
| 5,721,869 A | 2/1998 | Imakawa |
| 5,721,870 A | 2/1998 | Matsumoto |
| 5,724,563 A | 3/1998 | Hasegawa |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,748,950 A | 5/1998 | White et al. |
| 5,751,987 A | 5/1998 | Mahant-Shetti et al. |
| 5,761,507 A | 6/1998 | Govett |
| 5,761,522 A | 6/1998 | Hisanaga et al. |
| 5,781,774 A | 7/1998 | Krick |
| 5,784,649 A | 7/1998 | Begur et al. |
| 5,784,712 A | 7/1998 | Byers et al. |
| 5,787,454 A | 7/1998 | Rohlman |
| 5,796,413 A | 8/1998 | Shipp et al. |
| 5,797,043 A | 8/1998 | Lewis et al. |
| 5,802,373 A | 9/1998 | Yates et al. |
| 5,809,235 A | 9/1998 | Sharma et al. |
| 5,809,530 A | 9/1998 | Samra et al. |
| 5,812,811 A | 9/1998 | Dubey et al. |
| 5,812,839 A | 9/1998 | Hoyt et al. |
| 5,812,868 A | 9/1998 | Moyer et al. |
| 5,815,698 A | 9/1998 | Holmann et al. |
| 5,815,714 A | 9/1998 | Shridhar et al. |
| 5,819,080 A | 10/1998 | Dutton et al. |
| 5,822,619 A | 10/1998 | Sidwell |
| 5,828,746 A | 10/1998 | Ardon |
| 5,828,863 A | 10/1998 | Barrett et al. |
| 5,832,215 A | 11/1998 | Kato et al. |
| 5,832,258 A | 11/1998 | Kiuchi et al. |
| 5,835,755 A | 11/1998 | Stellwagen, Jr. |
| 5,838,975 A | 11/1998 | Abramson et al. |
| 5,848,276 A | 12/1998 | King et al. |
| 5,854,922 A | 12/1998 | Gravenstein et al. |
| 5,857,104 A | 1/1999 | Natarjan et al. |
| 5,859,789 A | 1/1999 | Sidwell |
| 5,859,790 A | 1/1999 | Sidwell |

| Patent | Kind | Date | Inventor |
|---|---|---|---|
| 5,860,085 | A | 1/1999 | Stormon et al. |
| 5,860,158 | A | 1/1999 | Pai et al. |
| 5,870,597 | A * | 2/1999 | Panwar et al. ............... 712/230 |
| 5,872,963 | A | 2/1999 | Bitar et al. |
| 5,875,355 | A | 2/1999 | Sidwell et al. |
| 5,875,470 | A | 2/1999 | Dreibelbis et al. |
| 5,884,069 | A | 3/1999 | Sidwell |
| 5,886,992 | A | 3/1999 | Raatikainen et al. |
| 5,887,134 | A | 3/1999 | Ebrahim |
| 5,890,208 | A | 3/1999 | Kwon |
| 5,892,979 | A | 4/1999 | Shiraki et al. |
| 5,898,866 | A | 4/1999 | Atkins et al. |
| 5,900,025 | A * | 5/1999 | Sollars ....................... 712/248 |
| 5,905,876 | A | 5/1999 | Pawlowski et al. |
| 5,905,889 | A | 5/1999 | Wilhelm, Jr. |
| 5,915,123 | A | 6/1999 | Mirsky et al. |
| 5,923,872 | A | 7/1999 | Chrysos et al. |
| 5,926,646 | A | 7/1999 | Pickett et al. |
| 5,928,358 | A | 7/1999 | Takayama et al. |
| 5,933,627 | A | 8/1999 | Parady |
| 5,937,177 | A | 8/1999 | Molnar et al. |
| 5,937,187 | A | 8/1999 | Kosche et al. |
| 5,938,736 | A | 8/1999 | Muller et al. |
| 5,940,612 | A | 8/1999 | Brady et al. |
| 5,940,866 | A | 8/1999 | Chisholm et al. |
| 5,943,491 | A | 8/1999 | Sutherland et al. |
| 5,944,816 | A | 8/1999 | Dutton et al. |
| 5,946,222 | A | 8/1999 | Redford |
| 5,946,487 | A | 8/1999 | Dangelo |
| 5,948,081 | A | 9/1999 | Foster |
| 5,951,679 | A | 9/1999 | Anderson et al. |
| 5,956,514 | A | 9/1999 | Wen et al. |
| 5,958,031 | A | 9/1999 | Kim |
| 5,961,628 | A | 10/1999 | Nguyen et al. |
| 5,970,013 | A | 10/1999 | Fischer et al. |
| 5,978,838 | A | 11/1999 | Mohamed et al. |
| 5,983,274 | A | 11/1999 | Hyder et al. |
| 5,993,627 | A | 11/1999 | Anderson et al. |
| 5,996,068 | A * | 11/1999 | Dwyer et al. ............... 712/228 |
| 6,002,881 | A | 12/1999 | York et al. |
| 6,005,575 | A | 12/1999 | Colleran et al. |
| 6,009,505 | A | 12/1999 | Thayer et al. |
| 6,009,515 | A | 12/1999 | Steele, Jr. |
| 6,012,151 | A | 1/2000 | Mano |
| 6,014,729 | A | 1/2000 | Lannan et al. |
| 6,023,742 | A | 2/2000 | Ebeling et al. |
| 6,029,228 | A | 2/2000 | Cai et al. |
| 6,052,769 | A | 4/2000 | Huff et al. |
| 6,058,168 | A | 5/2000 | Braband |
| 6,058,465 | A | 5/2000 | Nguyen |
| 6,061,710 | A | 5/2000 | Eickemeyer et al. |
| 6,061,711 | A | 5/2000 | Song et al. |
| 6,067,585 | A | 5/2000 | Hoang |
| 6,070,231 | A | 5/2000 | Ottinger |
| 6,072,781 | A | 6/2000 | Feeney et al. |
| 6,073,215 | A | 6/2000 | Snyder |
| 6,076,158 | A | 6/2000 | Sites et al. |
| 6,079,008 | A | 6/2000 | Clery, III |
| 6,079,014 | A | 6/2000 | Papworth et al. |
| 6,085,215 | A | 7/2000 | Ramakrishnan et al. |
| 6,085,294 | A | 7/2000 | Van Doren et al. |
| 6,092,127 | A | 7/2000 | Tausheck |
| 6,092,158 | A | 7/2000 | Harriman et al. |
| 6,092,175 | A | 7/2000 | Levy et al. |
| 6,100,905 | A | 8/2000 | Sidwell |
| 6,101,599 | A | 8/2000 | Wright et al. |
| 6,112,016 | A | 8/2000 | MacWilliams et al. |
| 6,115,777 | A | 9/2000 | Zahir et al. |
| 6,115,811 | A | 9/2000 | Steele, Jr. |
| 6,134,665 | A | 10/2000 | Klein et al. |
| 6,139,199 | A | 10/2000 | Rodriguez |
| 6,141,348 | A | 10/2000 | Muntz |
| 6,141,689 | A | 10/2000 | Yasrebi |
| 6,141,765 | A | 10/2000 | Sherman |
| 6,144,669 | A | 11/2000 | Williams et al. |
| 6,145,054 | A | 11/2000 | Mehrotra et al. |
| 6,145,077 | A | 11/2000 | Sidwell et al. |
| 6,145,123 | A | 11/2000 | Torrey et al. |
| 6,157,955 | A | 12/2000 | Narad et al. |
| 6,157,988 | A | 12/2000 | Dowling |
| 6,160,562 | A | 12/2000 | Chin et al. |
| 6,182,177 | B1 | 1/2001 | Harriman |
| 6,195,676 | B1 | 2/2001 | Spix et al. |
| 6,195,739 | B1 | 2/2001 | Wright et al. |
| 6,199,133 | B1 | 3/2001 | Schnell |
| 6,201,807 | B1 | 3/2001 | Prasanna |
| 6,205,468 | B1 | 3/2001 | Diepstraten et al. |
| 6,212,542 | B1 | 4/2001 | Kahle et al. |
| 6,212,611 | B1 | 4/2001 | Nizar et al. |
| 6,216,220 | B1 | 4/2001 | Hwang |
| 6,223,207 | B1 | 4/2001 | Lucovsky et al. |
| 6,223,208 | B1 | 4/2001 | Kiefer et al. |
| 6,223,238 | B1 | 4/2001 | Meyer et al. |
| 6,223,277 | B1 | 4/2001 | Karguth |
| 6,223,279 | B1 | 4/2001 | Nishimura et al. |
| 6,230,119 | B1 | 5/2001 | Mitchell |
| 6,230,230 | B1 | 5/2001 | Joy et al. |
| 6,230,261 | B1 | 5/2001 | Henry et al. |
| 6,247,025 | B1 | 6/2001 | Bacon |
| 6,256,713 | B1 | 7/2001 | Audityan et al. |
| 6,259,699 | B1 | 7/2001 | Opalka et al. |
| 6,269,391 | B1 | 7/2001 | Gillespie |
| 6,272,616 | B1 | 8/2001 | Fernando et al. |
| 6,275,505 | B1 | 8/2001 | O Loughlin et al. |
| 6,275,508 | B1 | 8/2001 | Aggarwal et al. |
| 6,279,066 | B1 | 8/2001 | Velingker |
| 6,279,113 | B1 | 8/2001 | Vaidya |
| 6,289,011 | B1 | 9/2001 | Seo et al. |
| 6,298,370 | B1 | 10/2001 | Tang et al. |
| 6,304,956 | B1 | 10/2001 | Tran |
| 6,307,789 | B1 | 10/2001 | Wolrich et al. |
| 6,314,510 | B1 | 11/2001 | Saulsbury et al. |
| 6,324,624 | B1 | 11/2001 | Wolrich et al. |
| 6,338,133 | B1 | 1/2002 | Schroter |
| 6,345,334 | B1 | 2/2002 | Nakagawa et al. |
| 6,347,344 | B1 | 2/2002 | Baker et al. |
| 6,351,808 | B1 | 2/2002 | Joy et al. |
| 6,356,962 | B1 | 3/2002 | Kasper et al. |
| 6,360,262 | B1 | 3/2002 | Guenthner et al. |
| 6,373,848 | B1 | 4/2002 | Allison et al. |
| 6,378,124 | B1 | 4/2002 | Bates et al. |
| 6,378,125 | B1 | 4/2002 | Bates et al. |
| 6,385,720 | B1 | 5/2002 | Tanaka et al. |
| 6,389,449 | B1 | 5/2002 | Nemirovsky et al. |
| 6,393,483 | B1 | 5/2002 | Latif et al. |
| 6,401,155 | B1 | 6/2002 | Saville et al. |
| 6,408,325 | B1 * | 6/2002 | Shaylor ....................... 718/108 |
| 6,415,338 | B1 | 7/2002 | Habot |
| 6,426,940 | B1 | 7/2002 | Seo et al. |
| 6,427,196 | B1 | 7/2002 | Adiletta et al. |
| 6,430,626 | B1 | 8/2002 | Witkowski et al. |
| 6,434,145 | B1 | 8/2002 | Opsasnick et al. |
| 6,442,669 | B2 | 8/2002 | Wright et al. |
| 6,446,190 | B1 | 9/2002 | Barry et al. |
| 6,463,072 | B1 | 10/2002 | Wolrich et al. |
| 6,496,847 | B1 | 12/2002 | Bugnion et al. |
| 6,505,229 | B1 | 1/2003 | Turner et al. |
| 6,523,108 | B1 | 2/2003 | James et al. |
| 6,532,509 | B1 | 3/2003 | Wolrich et al. |
| 6,543,049 | B1 | 4/2003 | Bates et al. |
| 6,552,826 | B2 | 4/2003 | Adler et al. |
| 6,560,629 | B1 | 5/2003 | Harris |
| 6,560,667 | B1 | 5/2003 | Wolrich et al. |
| 6,560,671 | B1 | 5/2003 | Samra et al. |
| 6,564,316 | B1 | 5/2003 | Perets et al. |
| 6,574,702 | B2 | 6/2003 | Khanna et al. |

| | | |
|---|---|---|
| 6,577,542 B2 | 6/2003 | Wolrich et al. |
| 6,584,522 B1 | 6/2003 | Wolrich et al. |
| 6,587,906 B2 | 7/2003 | Wolrich et al. |
| 6,606,704 B1 | 8/2003 | Adiletta et al. |
| 6,625,654 B1 | 9/2003 | Wolrich et al. |
| 6,629,237 B2 | 9/2003 | Wolrich et al. |
| 6,631,430 B1 | 10/2003 | Wolrich et al. |
| 6,631,462 B1 | 10/2003 | Wolrich et al. |
| 6,661,794 B1 | 12/2003 | Wolrich et al. |
| 6,667,920 B2 | 12/2003 | Wolrich et al. |
| 6,668,317 B1 | 12/2003 | Bernstein et al. |
| 6,681,300 B2 | 1/2004 | Wolrich et al. |
| 6,694,380 B1 | 2/2004 | Wolrich et al. |
| 6,697,935 B1 | 2/2004 | Borkenhagen et al. |
| 6,718,457 B2 | 4/2004 | Tremblay et al. |
| 6,784,889 B1 | 8/2004 | Radke |
| 6,836,838 B1 | 12/2004 | Wright et al. |
| 6,862,676 B1 | 3/2005 | Knapp et al. |
| 6,934,951 B2 | 8/2005 | Wilkinson, III et al. |
| 6,971,103 B2 | 11/2005 | Hokenek et al. |
| 6,976,095 B1 | 12/2005 | Wolrich et al. |
| 6,983,350 B1 | 1/2006 | Adiletta et al. |
| 7,020,871 B2 | 3/2006 | Bernstein et al. |
| 7,181,594 B2 | 2/2007 | Wilkinson, III et al. |
| 7,185,224 B1 | 2/2007 | Fredenburg et al. |
| 7,191,309 B1 | 3/2007 | Wolrich et al. |
| 7,302,549 B2 | 11/2007 | Wilkinson, III et al. |
| 7,421,572 B1 | 9/2008 | Wolrich et al. |
| 2002/0038403 A1 | 3/2002 | Wolrich et al. |
| 2002/0053017 A1 | 5/2002 | Adiletta et al. |
| 2002/0056037 A1* | 5/2002 | Wolrich et al. .............. 712/215 |
| 2003/0041228 A1 | 2/2003 | Rosenbluth et al. |
| 2003/0145159 A1 | 7/2003 | Adiletta et al. |
| 2003/0191866 A1 | 10/2003 | Wolrich et al. |
| 2004/0039895 A1 | 2/2004 | Wolrich et al. |
| 2004/0054880 A1 | 3/2004 | Bernstein et al. |
| 2004/0071152 A1 | 4/2004 | Wolrich et al. |
| 2004/0073728 A1 | 4/2004 | Wolrich et al. |
| 2004/0073778 A1 | 4/2004 | Adiletta et al. |
| 2004/0098496 A1 | 5/2004 | Wolrich et al. |
| 2004/0109369 A1 | 6/2004 | Wolrich et al. |
| 2004/0205747 A1 | 10/2004 | Bernstein et al. |
| 2007/0234009 A1 | 10/2007 | Wolrich et al. |

FOREIGN PATENT DOCUMENTS

| | | |
|---|---|---|
| EP | 0 379 709 | 8/1990 |
| EP | 0 463 855 | 1/1992 |
| EP | 0 464 715 | 1/1992 |
| EP | 4 476 628 | 3/1992 |
| EP | 0 633 678 | 1/1995 |
| EP | 0 696 772 | 2/1996 |
| EP | 0 745 933 | 12/1996 |
| EP | 0 809 180 | 11/1997 |
| EP | 0 863 462 | 9/1998 |
| FR | 2752966 | 3/1998 |
| JP | 59111533 | 6/1984 |
| WO | WO 92/07335 | 4/1992 |
| WO | WO 94/15287 | 7/1994 |
| WO | WO 97/38372 | 10/1997 |
| WO | WO 01/15718 | 3/2001 |
| WO | WO 01/16697 | 3/2001 |
| WO | WO 01/16698 | 3/2001 |
| WO | WO 01/16703 | 3/2001 |
| WO | WO 01/16713 | 3/2001 |
| WO | WO 01/16714 | 3/2001 |
| WO | WO 01/16715 | 3/2001 |
| WO | WO 01/16716 | 3/2001 |
| WO | WO 01/16718 | 3/2001 |
| WO | WO 01/16722 | 3/2001 |
| WO | WO 01/16758 | 3/2001 |
| WO | WO 01/16769 | 3/2001 |
| WO | WO 01/16770 | 3/2001 |
| WO | WO 01/16782 | 3/2001 |
| WO | WO 01/18646 | 3/2001 |
| WO | WO 01/41530 | 6/2001 |
| WO | WO 01/48596 | 7/2001 |
| WO | WO 01/48599 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |
| WO | WO 03/019399 | 3/2003 |
| WO | WO 03/085517 | 10/2003 |

OTHER PUBLICATIONS

Nuth, Peter R., The Named-State Register File, Aug. 1993, MIT ,Technical Report 1459, 136 pages.*

Paver et al., "Register Locking in Asynchronous Processor Computer Design: VLSI Processors," ICCD '92 Proceedings, IEEE 1992 International Conference, 1992, pp. 351-355.

Waldspurger et al., "Register Relocation: Flexible Contents for Multithreading," Proceedings of the 20th Annual International Symposium on Computer Architecture, 1993, pp. 120-130.

U.S. Appl. No. 09/473,571, filed Dec. 28, 1999, Wolrich et al.

U.S. Appl. No. 09/475,614, filed Dec. 30, 1999, Wolrich et al.

Agarneal et al., "April: A Processor ArchitecUre for Multiprocessing," Proceedings of the 17th Annual International Symposium on Computer Architecture, IEEE, pp. 104-114.

Byrd et al., "Multithread Processor Architectures," *IEEE Spectrum*, vol. 32, No. 8, New York, Aug. 1, 1995, pp. 38-46.

Chang et al., "A New Mechanism For Improving Branch Predictor Performance," IEEE, pp. 22-31 (1994).

Doyle et al., *Microsoft Press Computer Dictionary*, 2nd ed., Microsoft Press, Redmond, Washington, USA, 1994, p. 326.

Farkas et al., "The multicluster architecture: reducing cycle time through partitioning," IEEE, vol. 30, Dec. 1997, pp. 149-159.

Fillo et al., "The M-Machine Multicomputer," IEEE Proceedings of MICRO-28, 1995, pp. 146-156.

Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.

Haug et al., "Reconfigurable hardware as shared resource for parallel threads," IEEE Symposium on FPGAs for Custom Computing Machines, 1998.

Hauser et al., "Garp: a MIPS processor with a reconfigurable coprocessor," Proceedings of the 5th Annual IEEE Symposium on Field-Programmable Custom Computing Machines, 1997.

Hennessy et al., "Complete Organization and Design: The Hardware/Software Interface," Morgan Kaufman Publishers, 1998, pp. 476-482.

Hyde, R., "Overview of Memory Management," *Byte*, vol. 13, No. 4, 1998, pp. 219-225.

Intel, "1A-64 Application Developer's Architecture Guide," Rev. 1.0, May 1999, pp. 2-2, 4-29 to 4-31, 7-116 to 7-118 and c-21.

Keckler et al., "Exploiting fine grain thread level parallelism on the MIT multi-ALU processor," IEEE, Jun. 1998.

Litch et al., "StrongARMing Portable Communications," IEEE Micro, 1998, pp. 48-55.

Mendelson et al., "Design Alternatives of Multithreaded Architecture," *International Journal of Parallel Programming*, vol. 27, No. 3,Plenum Press, New York, USA, Jun. 1999, pp. 161-193.

Schmidt et al., "The Performance of Alternative Threading Architectures for Parallel Communication Subsystems," Internet Document, *Online!*, Nov. 13, 1998.

Thistle et al., "A Processor Architecture for Horizon," IEEE, 1998, pp. 35-41.

Tremblay et al., "A Three Dimensional Register File for Superscalar Processors," IEEE Proceedings of the 28th Annual Hawaii International Conference on System Sciences, 1995, pp. 191-201.

Trimberger et al, "A time-multiplexed FPGA," Proceedings of the 5th Annual IEEE Symposium on Field-Programmable Custom Computing Machines, 1998.

Turner et al., "Design of a High Performance Active Router," Internet Document, *Online*, Mar. 18, 1999.

Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.

Wadler, "The Concatenate Vanishes," University of Glasgow, Dec. 1987 (revised Nov. 1989), pp. 1-7.

Wazlowski et al., "PRISM-II computer and architecture," IEEE Proceedings, Workshop on FPGAs for Custom Computing Machines, 1993.

"IOP Task Switching", *IBM Technical Disclosure Bulletin*, 33(5):156-158, Oct. 1990.

"HART, Field Communications Protocol, Application Guide", Hart Communication Foundation, pp. 1-74, (1999).

Bowden, Romilly, "What is HART?" Romilly's HART® and Fieldbus Web Site, 3 pages, (1997). <URL: http://www.romilly.co.uk/whathart.htm>.

Cogswell, et al., "MACS: a predictable architecture for real time systems", IEEE Comp. Soc. Press, SYMP(12):296-305, (1991).

Fiske et al., "Thread prioritization: a thread scheduling mechanism for multiple-context parallel processors", IEEE Comput. Soc., pp. 210-221, (1995).

Hennesy et al., *Computer Organization and Design*: The Hardware/Software Interface, Morgan Kaufman Publishers, pp. 116-119, 181-182, 225-227, 447-449, 466-470, 476-482, 510-519, 712, (1998).

Heuring et al., *Computer Systems Design and Architecture*, Reading, MA, Addision Wesley Longman, Inc., pp. 174-176 and 200, (1997).

Heuring et al., *Computer Systems Design and Architecture*, Reading, MA, Addision Wesley Longman, Inc., pp. 38-40, 143-171, and 258-288, (1997).

Heuring et al., *Computer Systems Design and Architecture*, Reading, MA, Addision Wesley Longman, Inc., pp. 69-71, (1997).

Hirata, H., et al., "An Elementary Processor Architecture with Simultaneous Instruction Issuing from Multiple Threads", *Proc. 19th Annual International Symposium on Computer Architecture, ACM & IEEE-CS*, 20(2):136-145, May 1992.

Intel, "1A-64 Application Developer's Architecture Guide," Rev.1.0, pp. 2-2, 2-3, 3-1, 7-165, C-4, and C-23, May 1999.

Jung, G., et al., "Flexible Register Window Structure for Multi-Tasking", *Proc. 24th Annual Hawaii Conference on System Sciences*, vol. 1, pp. 110-116, (1991).

Kane, Gerry, *PA-RISC 2.0 Architecture*, 1995, Prentice Hall PTR, pp. 1-6, 7-13 & 7-14.

Koch, G., et al., "Breakpoints and Breakpoint Detection in Source Level Emulation", *Proc. 19th International Symposium on System Synthesis (ISSS '96), IEEE*, pp. 26-31 (1996).

Moors, et al., "Cascading Content-Addressable Memories", *IEEE Micro*, 12(3):56-66 (1992).

Patterson, et al., *Computer Architecture A Quantitative Approach*, 2nd Ed., Morgan Kaufmann Publishers, Inc., pp. 447-449, (1996).

Paver, et al., "Register Locking in an Asynchronous Microprocessor", *IEEE*, pp. 351-355, (1992).

Philips ED - Philips Components: "8051 Based 8 Bit Microcontrollers, Data Handbook Integrated Circuits, Book IC20", 8051 Based 8 Bit Microcontrollers, Eindhoven, Philips, NL, pp. 5-19 (1991).

Probst et al., "Programming, Compiling and Executing Partially-Ordered Instruction Streams on Scalable Shared-Memory Multiprocessors", *Proceedings of the 27th Annual Hawaiian International Conference on System Sciences, IEEE*, pp. 584-593, (1994).

Quammen, D., et al., "Flexible Register Management for Sequential Programs", *IEEE Proc. of the Annual International Symposium on the Computer Architecture*, Toronto, May 27-30, 1991, vol. SYMP. 18, pp. 320-329.

Ramsey, N., "Correctness of Trap-Based Breakpoint Implementations", *Proc. of the 21st ACM Symposium on the Principles of Programming Languages*, pp. 15-24 (1994).

Sproull, R.F., et al., "The Counterflow Pipeline Processor Architecture", *IEEE Design & Test of Computers*, pp. 48-59, (1994).

Steven, G.B., et al., "ALU design and processor branch architecture", *Miroprocessing and Microprogramming*, 36(5):259-278, Oct. 1993.

Young, H.C., "Code Scheduling Methods for Some Architectural Features in Pipe", *Microprocessing and Microprogramming*, Elsevier Science Publishers, Amsterdam, NL, 22(1):39-63, Jan. 1988.

Young, H.C., "On Instruction and Data Prefetch Mechanisms", *International Symposium on VLSI Technology, Systems and Applications, Proc. of Technical Papers*, pp. 239-246, (1995).

Hidaka, Y., et al., "Multiple Threads in Cyclic Register Windows", *Computer Architecture News*, ACM, New York, NY, USA, 21(2):131-142, May 1993.

Okamoto, K., et al., "Multithread Execution Mechanisms on RICA-1 for Massively Parallel Computation", *IEEE - Proc. Of PACT '96*, pp. 116-121 (1996).

* cited by examiner

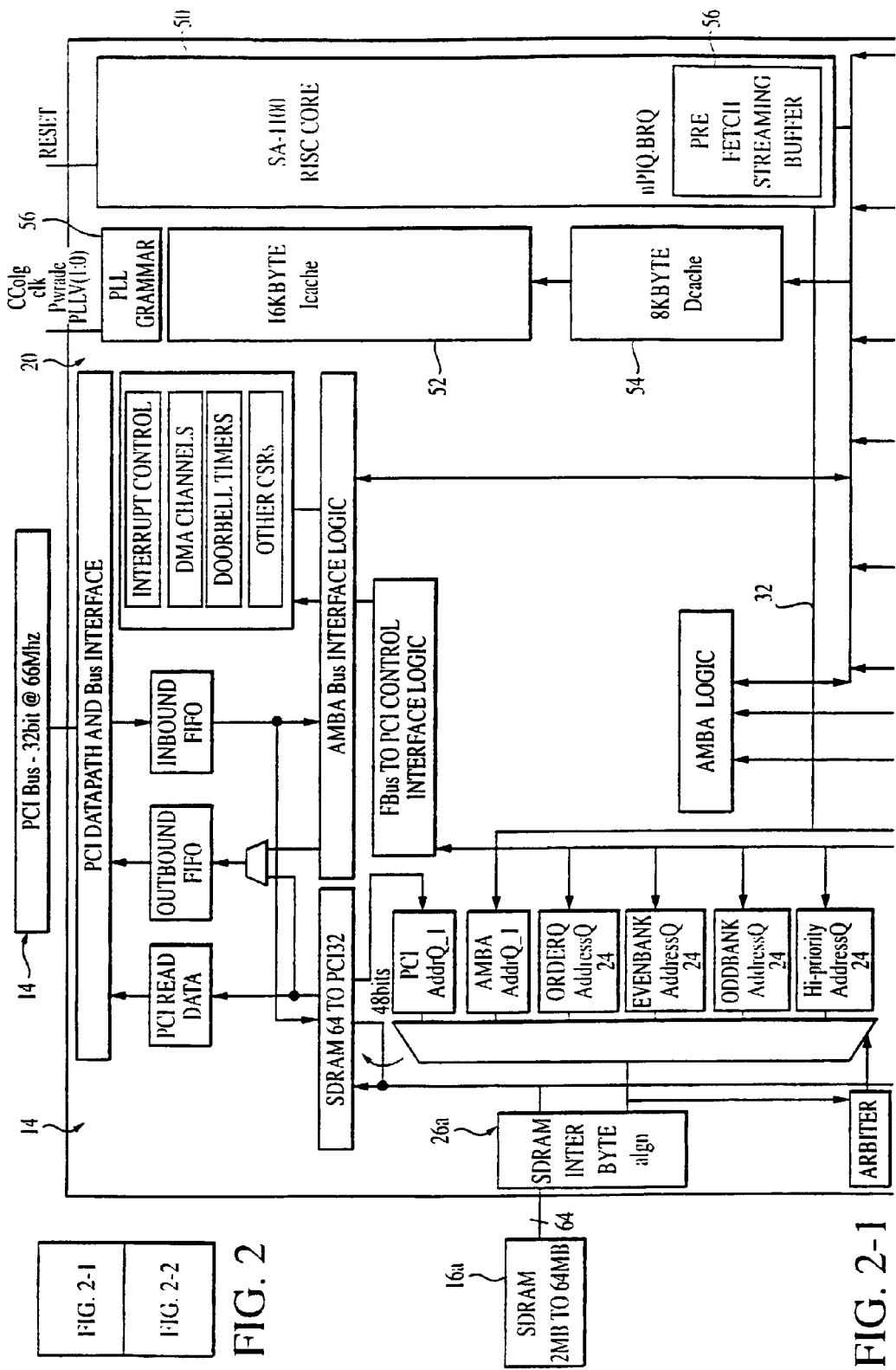

REGISTER SET USED IN MULTITHREADED PARALLEL PROCESSOR ARCHITECTURE

This application is a 371 Application of International Application PCT/US00/23993, filed Aug. 31, 2000, which claims the benefit of Provisional Patent Application Ser. No. 60/151,961 filed Sep. 1, 1999.

BACKGROUND

This invention relates to computer processors.

Parallel processing is an efficient form of information processing of concurrent events in a computing process. Parallel processing demands concurrent execution of many programs in a computer, in contrast to sequential processing. In the context of a parallel processor, parallelism involves doing more than one thing at the same time. Unlike a serial paradigm where all tasks are performed sequentially at a single station or a pipelined machine where tasks are performed at specialized stations, with parallel processing, a plurality of stations are provided with each capable of performing all tasks. That is, in general all or a plurality of the stations work simultaneously and independently on the same or common elements of a problem. Certain problems are suitable for solution by applying parallel processing.

DESCRIPTION

Figure 1:
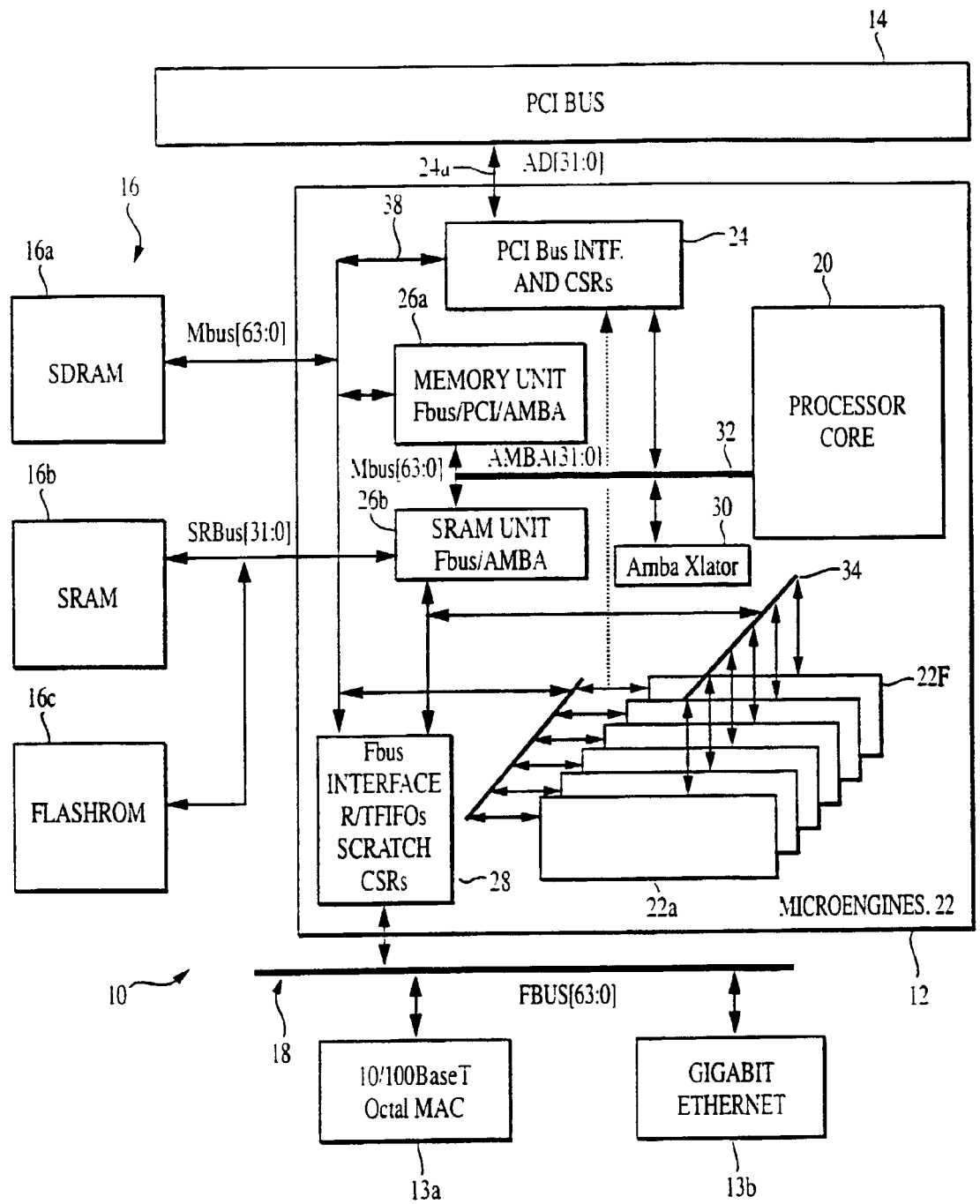
FIG. 1 is a block diagram of a communication system employing a hardware-based multithreaded processor.

Referring to FIG. 1, a communication system 10 includes a parallel, hardware-based multithreaded processor 12. The hardware-based multithreaded processor 12 is coupled to a bus such as a PCI bus 14, a memory system 16 and a second bus 18. The system 10 is especially useful for tasks that can be broken into parallel subtasks or functions. Specifically hardware-based multithreaded processor 12 is useful for tasks that are bandwidth oriented rather than latency oriented. The hardware-based multithreaded processor 12 has multiple microengines 22 each with multiple hardware controlled threads that can be simultaneously active and independently work on a task.

The hardware-based multithreaded processor 12 also includes a central controller 20 that assists in loading microcode control for other resources of the hardware-based multithreaded processor 12 and performs other general purpose computer type functions such as handling protocols, exceptions, extra support for packet processing where the microengines pass the packets off for more detailed processing such as in boundary conditions. In one embodiment, the processor 20 is a Strong Arm® (Arm is a trademark of ARM Limited, United Kingdom) based architecture. The general purpose microprocessor 20 has an operating system. Through the operating system the processor 20 can call functions to operate on microengines 22a-22f. The processor 20 can use any supported operating system preferably a real time operating system. For the core processor implemented as a Strong Arm architecture, operating systems such as, MicrosoftNT® real-time, VXWorks and □CUS, a freeware operating system available over the Internet, can be used.

The hardware-based multithreaded processor 12 also includes a plurality of function microengines 22a-22f Functional microengines (microengines) 22a-22f each maintain a plurality of program counters in hardware and states associated with the program counters. Effectively, a corresponding plurality of sets of threads can be simultaneously active on each of the microengines 22a-22f while only one is actually operating at any one time.

In one embodiment, there are six microengines 22a-22f as shown. Each microengines 22a-22f has capabilities for processing four hardware threads. The six microengines 22a-22f operate with shared resources including memory system 16 and bus interfaces 24 and 28. The memory system 16 includes a Synchronous Dynamic Random Access Memory (SDRAM) controller 26a and a Static Random Access Memory (SRAM) controller 26b. SDRAM memory 16a and SDRAM controller 26a are typically used for processing large volumes of data, e.g., processing of network payloads from network packets. The SRAM controller 26b and SRAM memory 16b are used in a networking implementation for low latency, fast access tasks, e.g., accessing look-up tables, memory for the core processor 20, and so forth.

The six microengines 22a-22f access either the SDRAM 16a or SRAM 16b based on characteristics of the data. Thus, low latency, low bandwidth data is stored in and fetched from SRAM, whereas higher bandwidth data for which latency is not as important, is stored in and fetched from SDRAM. The microengines 22a-22f can execute memory reference instructions to either the SDRAM controller 26a or SRAM controller 16b.

Advantages of hardware multithreading can be explained by SRAM or SDRAM memory accesses. As an example, an SRAM access requested by a Thread_0, from a microengine will cause the SRAM controller 26b to initiate an access to the SRAM memory 16b. The SRAM controller controls arbitration for the SRAM bus, accesses the SRAM 16b, fetches the data from the SRAM 16b, and returns data to a requesting microengine 22a-22b. During an SRAM access, if the microengine e.g., 22a had only a single thread that could operate, that microengine would be dormant until data was returned from the SRAM. By employing hardware context swapping within each of the microengines 22a-22f, the hardware context swapping enables other contexts with unique program counters to execute in that same microengine. Thus, another thread e.g., Thread_1 can function while the first thread, e.g., Thread_0, is awaiting the read data to return. During execution, Thread_1 may access the SDRAM memory 16a. While Thread_1 operates on the SDRAM unit, and Thread_0 is operating on the SRAM unit, a new thread, e.g., Thread_2 can now operate in the microengine 22a. Thread_2 can operate for a certain amount of time until it needs to access memory or perform some other long latency operation, such as making an access to a bus interface. Therefore, simultaneously, the processor 12 can have a bus operation, SRAM operation and SDRAM operation all being completed or operated upon by one microengine 22a and have one more thread available to process more work in the data path.

The hardware context swapping also synchronizes completion of tasks. For example, two threads could hit the same shared resource e.g., SRAM. Each one of these separate functional units, e.g., the FBUS interface 28, the SRAM controller 26a, and the SDRAM controller 26b, when they complete a requested task from one of the microengine thread contexts reports back a flag signaling completion of an operation. When the flag is received by the microengine, the microengine can determine which thread to turn on.

One example of an application for the hardware-based multithreaded processor 12 is as a network processor. As a network processor, the hardware-based multithreaded processor 12 interfaces to network devices such as a media access controller device e.g., a 10/100BaseT Octal MAC 13a or a Gigabit Ethernet device 13b. In general, as a network processor, the hardware-based multithreaded processor 12 can interface to any type of communication device or interface that receives/sends large amounts of data. Communication system 10 functioning in a networking application could receive a plurality of network packets from the devices 13a, 13b and process those packets in a parallel manner. With the hardware-based multithreaded processor 12, each network packet can be independently processed.

Another example for use of processor 12 is a print engine for a postscript processor or as a processor for a storage subsystem, i.e., RAID disk storage. A further use is as a matching engine. In the securities industry for example, the advent of electronic trading requires the use of electronic matching engines to match orders between buyers and sellers. These and other parallel types of tasks can be accomplished on the system 10.

The processor 12 includes a bus interface 28 that couples the processor to the second bus 18. Bus interface 28 in one embodiment couples the processor 12 to the so-called FBUS 18 (FIFO bus). The FBUS interface 28 is responsible for controlling and interfacing the processor 12 to the FBUS 18. The FBUS 18 is a 64-bit wide FIFO bus, used to interface to Media Access Controller (MAC) devices.

The processor 12 includes a second interface e.g., a PCI bus interface 24 that couples other system components that reside on the PCI 14 bus to the processor 12. The PCI bus interface 24, provides a high speed data path 24a to memory 16 e.g., the SDRAM memory 16a. Through that path data can be moved quickly from the SDRAM 16a through the PCI bus 14, via direct memory access (DMA) transfers. The hardware based multithreaded processor 12 supports image transfers. The hardware based multithreaded processor 12 can employ a plurality of DMA channels so if one target of a DMA transfer is busy, another one of the DMA channels can take over the PCI bus to deliver information to another target to maintain high processor 12 efficiency. Additionally, the PCI bus interface 24 supports target and master operations. Target operations are operations where slave devices on bus 14 access SDRAMs through reads and writes that are serviced as a slave to target operation. In master operations, the processor core 20 sends data directly to or receives data directly from the PCI interface 24.

Each of the functional units are coupled to one or more internal buses. As described below, the internal buses are dual, 32 bit buses (i.e., one bus for read and one for write). The hardware-based multithreaded processor 12 also is constructed such that the sum of the bandwidths of the internal buses in the processor 12 exceed the bandwidth of external buses coupled to the processor 12. The processor 12 includes an internal core processor bus 32, e.g., an ASB bus (Advanced System Bus) that couples the processor core 20 to the memory controller 26a, 26c and to an ASB translator 30 described below. The ASB bus is a subset of the so called AMBA bus that is used with the Strong Arm processor core. The processor 12 also includes a private bus 34 that couples the microengine units to SRAM controller 26b, ASB translator 30 and FBUS interface 28. A memory bus 38 couples the memory controller 26a, 26b to the bus interfaces 24 and 28 and memory system 16 including flashrom 16c used for boot operations and so forth.

Figure 2:
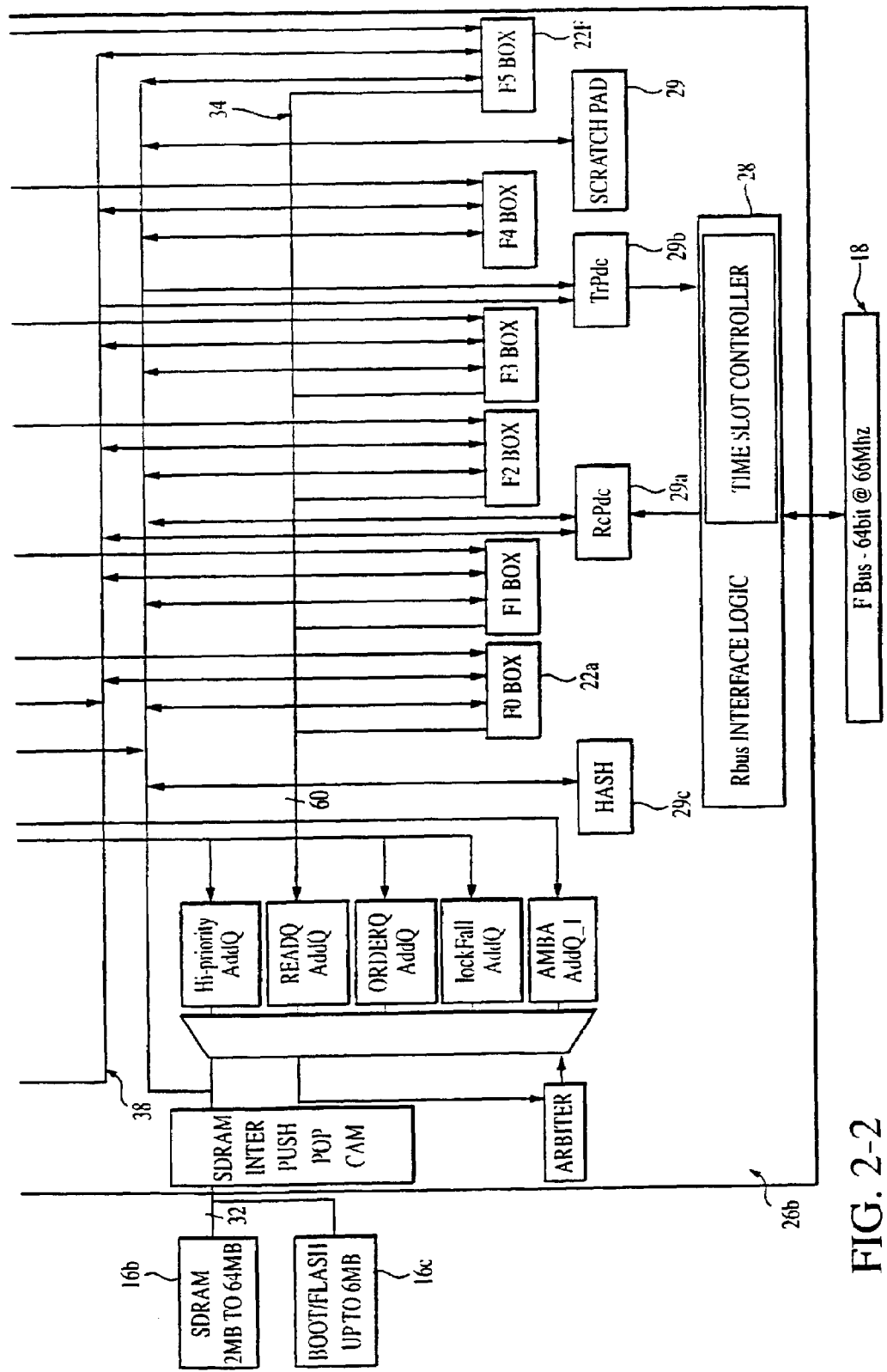
FIG. 2 is a detailed block diagram of the hardware-based multithreaded processor of FIG. 1.

Referring to FIG. 2, each of the microengines 22a-22f includes an arbiter that examines flags to determine the available threads to be operated upon. Any thread from any of the microengines 22a-22f can access the SDRAM controller 26a, SDRAM controller 26b or FBUS interface 28. The memory controllers 26a and 26b each include a plurality of queues to store outstanding memory reference requests. The queues either maintain order of memory references or arrange memory references to optimize memory bandwidth. For example, if a thread_0 has no dependencies or relationship to a thread_1, there is no reason that thread 1 and 0 cannot complete their memory references to the SRAM unit out of order. The microengines 22a-22f issue memory reference requests to the memory controllers 26a and 26b. The microengines 22a-22f flood the memory subsystems 26a and 26b with enough memory reference operations such that the memory subsystems 26a and 26b become the bottleneck for processor 12 operation.

If the memory subsystem 16 is flooded with memory requests that are independent in nature, the processor 12 can perform memory reference sorting. Memory reference sorting improves achievable memory bandwidth. Memory reference sorting, as described below, reduces dead time or a bubble that occurs with accesses to SRAM. With memory references to SRAM, switching current direction on signal lines between reads and writes produces a bubble or a dead time waiting for current to settle on conductors coupling the SRAM 16b to the SRAM controller 26b.

That is, the drivers that drive current on the bus need to settle out prior to changing states. Thus, repetitive cycles of a read followed by a write can degrade peak bandwidth. Memory reference sorting allows the processor 12 to organize references to memory such that long strings of reads can be followed by long strings of writes. This can be used to minimize dead time in the pipeline to effectively achieve closer to maximum available bandwidth. Reference sorting helps maintain parallel hardware context threads. On the SDRAM, reference sorting allows hiding of pre-charges from one bank to another bank. Specifically, if the memory system 16b is organized into an odd bank and an even bank, while the processor is operating on the odd bank, the memory controller can start precharging the even bank. Precharging is possible if memory references alternate between odd and even banks. By ordering memory references to alternate accesses to opposite banks, the processor 12 improves SDRAM bandwidth. Additionally, other optimizations can be used. For example, merging optimizations where operations that can be merged, are merged prior to memory access, open page optimizations where by examining addresses an opened page of memory is not reopened, chaining, as will be described below, and refreshing mechanisms, can be employed.

The FBUS interface 28 supports Transmit and Receive flags for each port that a MAC device supports, along with an Interrupt flag indicating when service is warranted. The FBUS interface 28 also includes a controller 28a that performs header processing of incoming packets from the FBUS 18. The controller 28a extracts the packet headers and performs a microprogrammable source/destination/protocol hashed lookup (used for address smoothing) in SRAM. If the hash does not successfully resolve, the packet header is sent to the processor core 20 for additional processing. The FBUS interface 28 supports the following internal data transactions:

| | | |
|---|---|---|
| FBUS unit | (Shared bus SRAM) | to/from microengine. |
| FBUS unit | (via private bus) | writes from SDRAM Unit. |
| FBUS unit | (via Mbus) | Reads to SDRAM. |

The FBUS 18 is a standard industry bus and includes a data bus, e.g., 64 bits wide and sideband control for address and read/write control. The FBUS interface 28 provides the ability to input large amounts of data using a series of input and output FIFO's 29a-29b. From the FIFOs 29a-29b, the microengines 22a-22f fetch data from or command the SDRAM controller 26a to move data from a receive FIFO in which data has come from a device on bus 18, into the FBUS interface 28. The data can be sent through memory controller 26a to SDRAM memory 16a, via a direct memory access. Similarly, the microengines can move data from the SDRAM 26a to interface 28, out to FBUS 18, via the FBUS interface 28.

Data functions are distributed amongst the microengines. Connectivity to the SRAM 26a, SDRAM 26b and FBUS 28 is via command requests. A command request can be a memory request or a FBUS request. For example, a command request can move data from a register located in a microengine 22a to a shared resource, e.g., an SDRAM location, SRAM location, flash memory or some MAC address. The commands are sent out to each of the functional units and the shared resources. However, the shared resources do not need to maintain local buffering of the data. Rather, the shared resources access distributed data located inside of the microengines. This enables microengines 22a-22f, to have local access to data rather than arbitrating for access on a bus and risk contention for the bus. With this feature, there is a 0 cycle stall for waiting for data internal to the microengines 22a-22f.

The data buses, e.g., ASB bus 30, SRAM bus 34 and SDRAM bus 38 coupling these shared resources, e.g., memory controllers 26a and 26b are of sufficient bandwidth such that there are no internal bottlenecks. Thus, in order to avoid bottlenecks, the processor 12 has an bandwidth requirement where each of the functional units is provided with at least twice the maximum bandwidth of the internal buses. As an example, the SDRAM can run a 64 bit wide bus at 83 MHz. The SRAM data bus could have separate read and write buses, e.g., could be a read bus of 32 bits wide running at 166 MHz and a write bus of 32 bits wide at 166 MHz. That is, in essence, 64 bits running at 166 MHz which is effectively twice the bandwidth of the SDRAM.

The core processor 20 also can access the shared resources. The core processor 20 has a direct communication to the SDRAM controller 26a to the bus interface 24 and to SRAM controller 26b via bus 32. However, to access the microengines 22a-22f and transfer registers located at any of the microengines 22a-22f, the core processor 20 access the microengines 22a-22f via the ASB Translator 30 over bus 34. The ASB translator 30 can physically reside in the FBUS interface 28, but logically is distinct. The ASB Translator 30 performs an address translation between FBUS microengine transfer register locations and core processor addresses (i.e., ASB bus) so that the core processor 20 can access registers belonging to the microengines 22a-22c.

Although microengines 22 can use the register set to exchange data as described below, a scratchpad memory 27 is also provided to permit microengines to write data out to the memory for other microengines to read. The scratchpad 27 is coupled to bus 34.

The processor core 20 includes a RISC core 50 implemented in a five stage pipeline performing a single cycle shift of one operand or two operands in a single cycle, provides multiplication support and 32 bit barrel shift support. This RISC core 50 is a standard Strong Arm® architecture but it is implemented with a five stage pipeline for performance reasons. The processor core 20 also includes a 16 kilobyte instruction cache 52, an 8 kilobyte data cache 54 and a prefetch stream buffer 56. The core processor 20 performs arithmetic operations in parallel with memory writes and instruction fetches. The core processor 20 interfaces with other functional units via the ARM defined ASB bus. The ASB bus is a 32-bit bi-directional bus 32.

Figure 3:
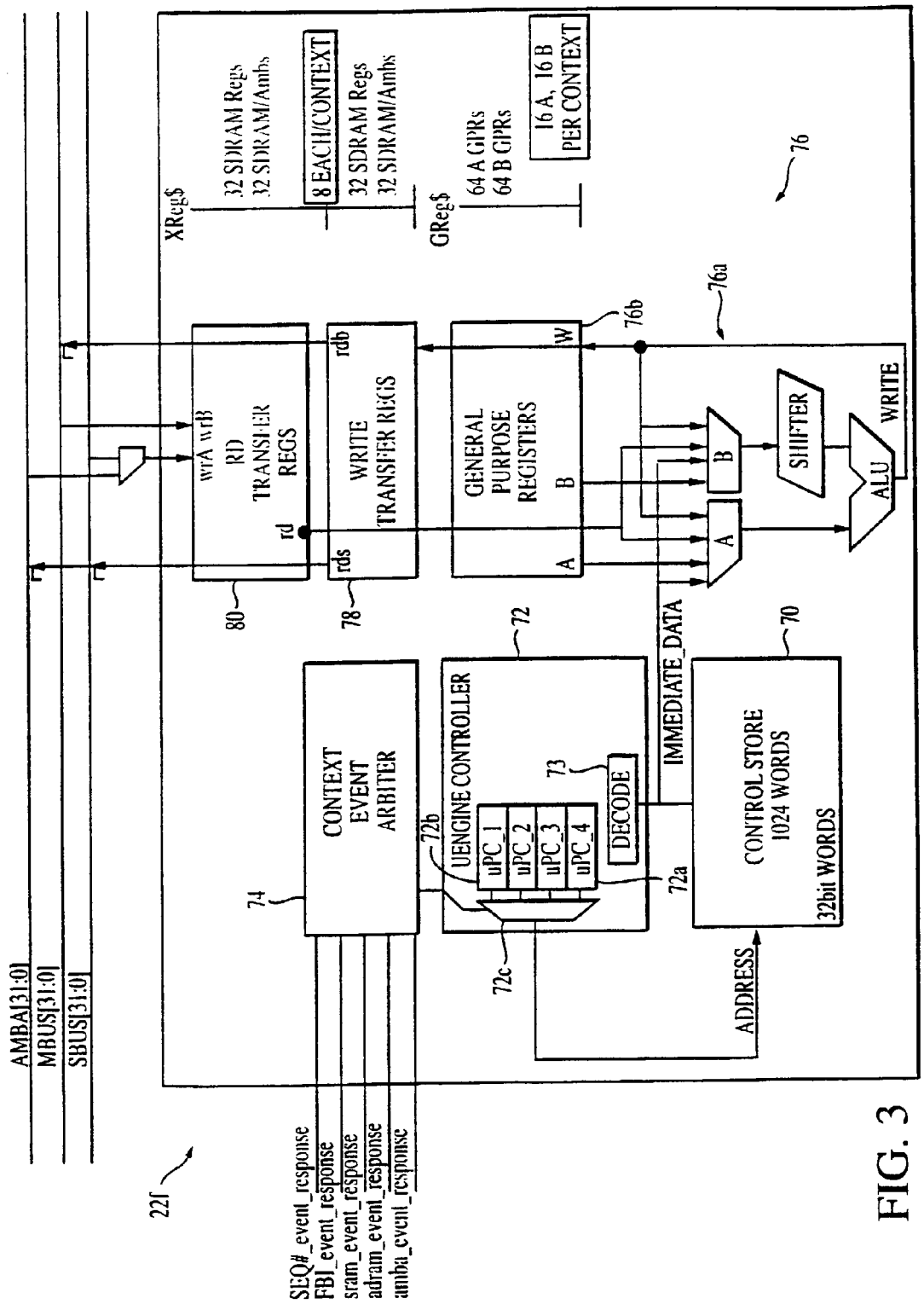
FIG. 3 is a block diagram of a microengine functional unit employed in the hardware-based multithreaded processor of FIGS. 1 and 2.

Microengines:

Referring to FIG. 3, an exemplary one of the microengines 22a-22f, e.g., microengine 22f is shown. The microengine includes a control store 70 which, in one implementation, includes a RAM of here 1,024 words of 32 bit. The RAM stores a microprogram. The microprogram is loadable by the core processor 20. The microengine 22f also includes controller logic 72. The controller logic includes an instruction decoder 73 and program counter (PC) units 72a-72d. The four micro program counters 72a-72d are maintained in hardware. The microengine 22f also includes context event switching logic 74. Context event logic 74 receives messages (e.g., SEQ_#_EVENT_RESPONSE; FBI_EVENT_RESPONSE; SRAM_EVENT_RESPONSE; SDRAM_EVENT_RESPONSE; and ASB_EVENT_RESPONSE) from each one of the shared resources, e.g., SRAM 26a, SDRAM 26b, or processor core 20, control and status registers, and so forth. These messages provide information on whether a requested function has completed. Based on whether or not a function requested by a thread has completed and signaled completion, the thread needs to wait for that completion signal, and if the thread is enabled to operate, then the thread is placed on an available thread list (not shown). The microengine 22f can have a maximum of e.g., 4 threads available.

In addition to event signals that are local to an executing thread, the microengines 22 employ signaling states that are global. With signaling states, an executing thread can broadcast a signal state to all microengines 22. Receive Request Available signal, Any and all threads in the microengines can branch on these signaling states. These signaling states can be used to determine availability of a resource or whether a resource is due for servicing.

The context event logic 74 has arbitration for the four (4) threads. In one embodiment, the arbitration is a round robin mechanism. Other techniques could be used including priority queuing or weighted fair queuing. The microengine 22f also includes an execution box (EBOX) data path 76 that includes an arithmetic logic unit 76a and general purpose register set 76b. The arithmetic logic unit 76a performs arithmetic and logical functions as well as shift functions. The registers set 76b has a relatively large number of general purpose registers. As will be described in FIG. 6, in this implementation there are 64 general purpose registers in a first bank, Bank A and 64 in a second bank, Bank B. The general purpose registers are windowed as will be described so that they are relatively and absolutely addressable.

The microengine 22f also includes a write transfer register stack 78 and a read transfer stack 80. These registers are also windowed so that they are relatively and absolutely addressable. Write transfer register stack 78 is where write data to a resource is located. Similarly, read register stack 80 is for return data from a shared resource. Subsequent to or concurrent with data arrival, an event signal from the respective shared resource e.g., the SRAM controller 26a, SDRAM controller 26b or core processor 20 will be provided to context event arbiter 74 which will then alert the thread that the data is available or has been sent. Both transfer register banks 78 and 80 are connected to the execution box (EBOX) 76 through a data path. In one implementation, the read transfer register has 64 registers and the write transfer register has 64 registers.

Figure 4:
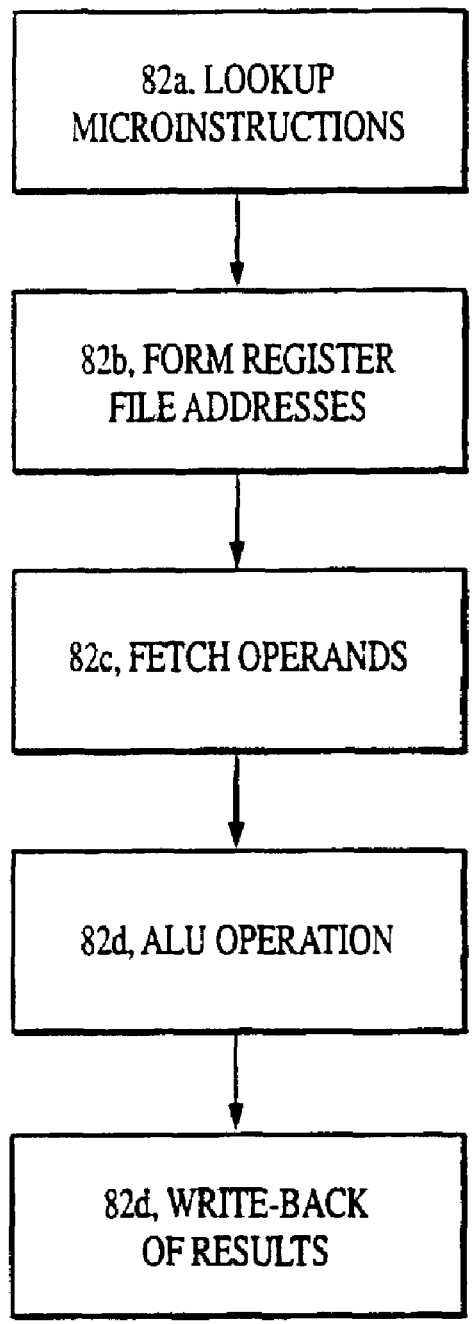
FIG. 4 is a block diagram of a pipeline in the microengine of FIG. 3.

Referring to FIG. 4, the microengine datapath maintains a 5-stage micro-pipeline 82. This pipeline includes lookup of microinstruction words 82a, formation of the register file addresses 82b, read of operands from register file 82c, ALU, shift or compare operations 82d, and write-back of results to registers 82e. By providing a write-back data bypass into the ALU/shifter units, and by assuming the registers are implemented as a register file (rather than a RAM), the microengine can perform a simultaneous register file read and write, which completely hides the write operation.

The SDRAM interface 26a provides a signal back to the requesting microengine on reads that indicates whether a parity error occurred on the read request. The microengine microcode is responsible for checking the SDRAM read Parity flag when the microengine uses any return data. Upon checking the flag, if it was set, the act of branching on it clears it. The Parity flag is only sent when the SDRAM is enabled for checking, and the SDRAM is parity protected. The microengines and the PCI Unit are the only requesters notified of parity errors. Therefore, if the processor core 20 or FIFO requires parity protection, a microengine assists in the request.

Figure 5:
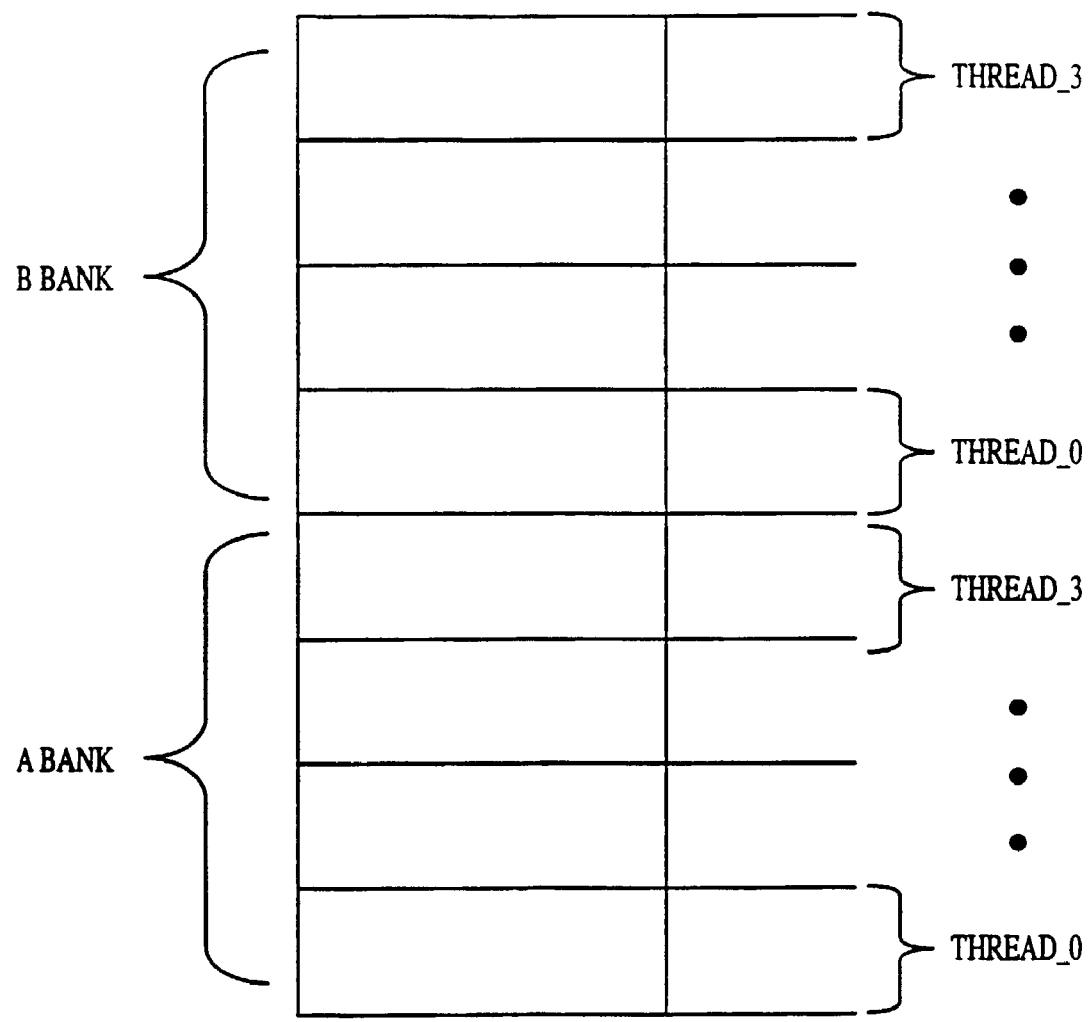
FIG. 5 is a block diagram showing general purpose register address arrangement.

Referring to FIG. 5, the two register address spaces that exist are Locally accessibly registers, and Globally accessible registers accessible by all microengines. The General Purpose Registers (GPRs) are implemented as two separate banks (A bank and B bank) whose addresses are interleaved on a word-by-word basis such that A bank registers have lsb=0, and B bank registers have lsb=1. Each bank is capable of performing a simultaneous read and write to two different words within its bank.

Across banks A and B, the register set 76b is also organized into four windows 76b$_0$-76b$_3$ of 32 registers that are relatively addressable per thread. Thus, thread_0 will find its register 0 at 77a (register 0), the thread_1 will find its register_0 at 77b (register 32), thread_2 will find its register_0 at 77c (register 64), and thread_3 at 77d (register 96). Relative addressing is supported so that multiple threads can use the exact same control store and locations but access different windows of register and perform different functions. The uses of register window addressing and bank addressing provide the requisite read bandwidth using only dual ported RAMS in the microengine 22f.

These windowed registers do not have to save data from context switch to context switch so that the normal push and pop of a context swap file or stack is eliminated. Context switching here has a 0 cycle overhead for changing from one context to another. Relative register addressing divides the register banks into windows across the address width of the general purpose register set. Relative addressing allows access any of the windows relative to the starting point of the window. Absolute addressing is also supported in this architecture where any one of the absolute registers may be accessed by any of the threads by providing the exact address of the register.

Addressing of general purpose registers 78 occurs in 2 modes depending on the microword format. The two modes are absolute and relative. In absolute mode, addressing of a register address is directly specified in 7-bit source field (a6-a0 or b6-b0):

```
     7   6   5   4   3   2   1   0
   +---+---+---+---+---+---+---+---+
     A  GPR: | a6 | 0 | a5 | a4 | a3 | a2 | a1 | a0 | a6 = 0
     B  GPR: | b6 | 1 | b5 | b4 | b3 | b2 | b1 | b0 | b6 = 0
   SRAM/ASB: | a6 | a5 | a4 | 0 | a3 | a2 | a1 | a0 | a6 = 1, a5 = 0, a4 = 0
    SDRAM  : | a6 | a5 | a4 | 0 | a3 | a2 | a1 | a0 | a6 = 1, a5 = 0, a4 = 1
``` register address directly specified in 8-bit dest field (d7-d0):

```
     7   6   5   4   3   2   1   0
   +---+---+---+---+---+---+---+---+
     A  GPR: | d7 | d6 | d5 | d4 | d3 | d2 | d1 | d0 | d7 = 0, d6 = 0
     B  GPR: | d7 | d6 | d5 | d4 | d3 | d2 | d1 | d0 | d7 = 0, d6 = 1
   SRAM/ASB: | d7 | d6 | d5 | d4 | d3 | d2 | d1 | d0 | d7 = 1, d6 = 0, d5 = 0
    SDRAM  : | d7 | d6 | d5 | d4 | d3 | d2 | d1 | d0 | d7 = 1, d6 = 0, d5 = 1
```

If <a6:a5>=1,1, <b6:b5>=1,1, or <d7:d6>=1,1 then the lower bits are interpreted as a context-relative address field (described below). When a non-relative A or B source address is specified in the A, B absolute field, only the lower half of the SRAM/ASB and SDRAM address spaces can be addressed. Effectively, reading absolute SRAM/SDRAM devices has the effective address space; however, since this restriction does not apply to the dest field, writing the SRAM/SDRAM still uses the full address space.

In relative mode, addresses a specified address is offset within context space as defined by a 5-bit source field (a4-a0 or b4-b0):

```
     7   6   5   4   3   2   1   0
   +---+---+---+---+---+---+---+---+
     A  GPR: | a4 | 0 | context | a3 | a2 | a1 | a0 | a4 = 0
     B  GPR: | b4 | 1 | context | b3 | b2 | b1 | b0 | b4 = 0
   SRAM/ASB: | ab4 | 0 | ab3 | context | b2 | b1 | ab0 | ab4 = 1, ab3 = 0
    SDRAM  : | ab4 | 0 | ab3 | context | b2 | b1 | ab0 | ab4 = 1, ab3 = 1
``` or as defined by the 6-bit dest field (d5-d0):

```
     7   6   5   4   3   2   1   0
   +---+---+---+---+---+---+---+---+
     A  GPR: | d5 | d4 | context | d3 | d2 | d1 | d0 | d5 = 0, d4 = 0
     B  GPR: | d5 | d4 | context | d3 | d2 | d1 | d0 | d5 = 0, d4 = 1
   SRAM/ASB: | d5 | d4 | d3 | context | d2 | d1 | d0 | d5 = 1, d4 = 0, d3 = 0
    SDRAM  : | d5 | d4 | d3 | context | d2 | d1 | d0 | d5 = 1, d4 = 0, d3 = 1
```

If <d5:d4>=1,1, then the destination address does not address a valid register, thus, no dest operand is written back.

Other embodiments are within the scope of the appended claims.

What is claimed is:

1. A method of maintaining execution threads in a parallel multithreaded processor comprises:

accessing, by a thread executing in the multithreaded processor, a register in a register set organized into a plurality of windows of registers, each of the plurality of windows of registers associated with a corresponding thread, each register in the plurality of windows of registers being relatively addressable by the corresponding thread and absolutely addressable by two or more of the threads executing on the multithreaded processor with absolutely addressable comprises providing an exact address of the register with the exact address specified in an instruction.

2. The method of claim 1 wherein multiple threads can use the same control store and relative register locations but access different window banks of registers.

3. The method of claim 1 wherein the relative register addressing divides the register banks into windows across the address width of the general purpose register set.

4. The method of claim 1 wherein relative addressing allows access any of the window registers relative to the starting point of a window of registers.

5. The method of claim 1 further comprising:

organizing the register set into windows according to the number of threads that execute in the processor.

6. The method of claim 1 wherein relative addressing allow the multiple threads to use the same control store and locations while allowing access to different windows of register and perform different functions.

7. The method of claim 1 wherein the window registers are implemented using dual ported random access memories.

8. The method of claim 1 wherein relative addressing allows access to any of the windows of registers relative to the starting point of the window of registers.

9. The method of claim 1 wherein the exact address of the register is directly specified in a source field or destination field of the instruction.

10. The method of claim 1 wherein relative addresses are specified in instructions as an address offset within a context execution space as defined by a source field or destination field operand.

11. A hardware based multi-threaded processor comprises:

a processor unit comprising:

control logic circuit including context event switching logic, the context switching logic arbitrating access to the microengine for a plurality of executable threads;

an arithmetic logic unit to process data for executing threads; and a register set that is organized into a plurality of windows of registers, each of the plurality of windows of registers associated with a corresponding one of the plurality of threads, each register in the plurality of windows of registers being relatively addressable by the corresponding thread associated with the respective window of registers and absolutely addressable by two or more of the threads executing on the multi-threaded processor, with any one of the registers of the register set being absolutely addressable by providing an exact address of the register with the exact address specified in an instruction.

12. The processor of claim 11 wherein the control logic circuit further comprises:

an instruction decoder; and program counter units to track executing threads.

13. The processor of claim 12 wherein the program counters units are maintained in hardware.

14. The processor of claim 11 wherein the register set is organized into windows across an address width of the general purpose register set with each window relatively accessible by the corresponding thread.

15. The processor of claim 14 wherein the relative addressing allows access to any of the registers relative to the starting point of a window of registers.

16. The processor of claim 14 wherein the number of windows of the register set is according to the number of threads that execute in the processor.

17. The processor of claim 11 wherein relative addressing allow the multiple threads to use the same control store and locations while allowing access to different windows of register and perform different functions.

18. The processor of claim 11 wherein the windows of registers are provided using dual ported random access memories.

19. The processor of claim 11 wherein the processing unit is a microprogrammed processor unit.

20. A computer program product residing on a computer readable storage medium for managing execution of multiple threads in a multithreaded processor comprising instructions causing a processor to:

access, by an executing thread in the multithreaded processor, a register in a register set organized into a plurality of windows of registers, each of the plurality of windows of registers being associated with a corresponding thread, each register in the plurality of windows of registers being relatively addressable by the corresponding thread and absolutely addressable by two or more threads executing on the multithreaded processor with absolutely addressable comprises instructions that when executed cause the processor to provide an exact address of the register with the exact address specified in an instruction.

* * * * *

UNITED STATES PATENT AND TRADEMARK OFFICE
CERTIFICATE OF CORRECTION

PATENT NO. : 7,546,444 B1
APPLICATION NO. : 10/070091
DATED : June 9, 2009
INVENTOR(S) : Gilbert Wolrich et al.

Page 1 of 1

It is certified that error appears in the above-identified patent and that said Letters Patent is hereby corrected as shown below:

Claim 4:
    column 9, line 24:
        add --to-- after "access"

Claim 6:
    column 9, line 29:
        delete "allow", and replace with --allows--

Claim 17:
    column 10, line 28:
        delete "allow", and replace with --allows--

Signed and Sealed this

Twenty-fifth Day of August, 2009

David J. Kappos
*Director of the United States Patent and Trademark Office*